United States Patent
Kim et al.

(10) Patent No.: US 8,136,776 B2
(45) Date of Patent: Mar. 20, 2012

(54) TILTING DEVICE

(75) Inventors: Jae-Kyung Kim, Ansan-si (KR); Yeon-Ho Son, Suwon-si (KR)

(73) Assignee: Sentronix Co., Ltd., Suwon (KR)

( * ) Notice: Subject to any disclaimer, the term of this patent is extended or adjusted under 35 U.S.C. 154(b) by 785 days.

(21) Appl. No.: 12/213,200

(22) Filed: Jun. 16, 2008

(65) Prior Publication Data

US 2009/0026340 A1    Jan. 29, 2009

(30) Foreign Application Priority Data

Jul. 23, 2007    (KR) .................. 10-2007-0073261

(51) Int. Cl.
*E04G 3/00* (2006.01)

(52) U.S. Cl. ............. 248/291.1; 248/299.1; 248/292.14; 248/923; 248/393

(58) Field of Classification Search .................. 248/121, 248/126, 291.1, 299.1, 292.14, 919, 921–923, 248/393–397, 124.1, 183.2, 185.1
See application file for complete search history.

(56) References Cited

U.S. PATENT DOCUMENTS

| | | | | |
|---|---|---|---|---|
| 5,833,183 A * | 11/1998 | Chang | ........................ | 248/176.1 |
| 5,915,658 A * | 6/1999 | Sheng | ....................... | 248/346.06 |
| 6,027,257 A * | 2/2000 | Richards et al. | .............. | 396/428 |
| 6,655,645 B1 * | 12/2003 | Lu et al. | ...................... | 248/176.1 |
| 7,527,233 B2 * | 5/2009 | Yen | ............................... | 248/371 |
| 7,780,131 B2 * | 8/2010 | Oh | .............................. | 248/276.1 |

FOREIGN PATENT DOCUMENTS

KR    2002-0080893    10/2002

OTHER PUBLICATIONS

Korean Office Action issued on Nov. 14, 2008 in corresponding Korean Patent Application No. 10-2007-0073261.

* cited by examiner

*Primary Examiner* — Kimberly Wood

(57) ABSTRACT

A tilting device is disclosed. A tilting device for tiltably supporting a mass may include: a bracket, which is attachable to and detachable from the mass, and which is configured to tilt about a rotation shaft; a nut, which is hinge-coupled to one side of the bracket about a hinge shaft; a leadscrew, which engages the nut; and a housing, which supports either side of the rotation shaft, and in which a guide indentation is formed that guides a movement of the hinge shaft. The tilting device utilizes a simple link structure to tilt a mass using a small-capacity driving unit.

11 Claims, 5 Drawing Sheets

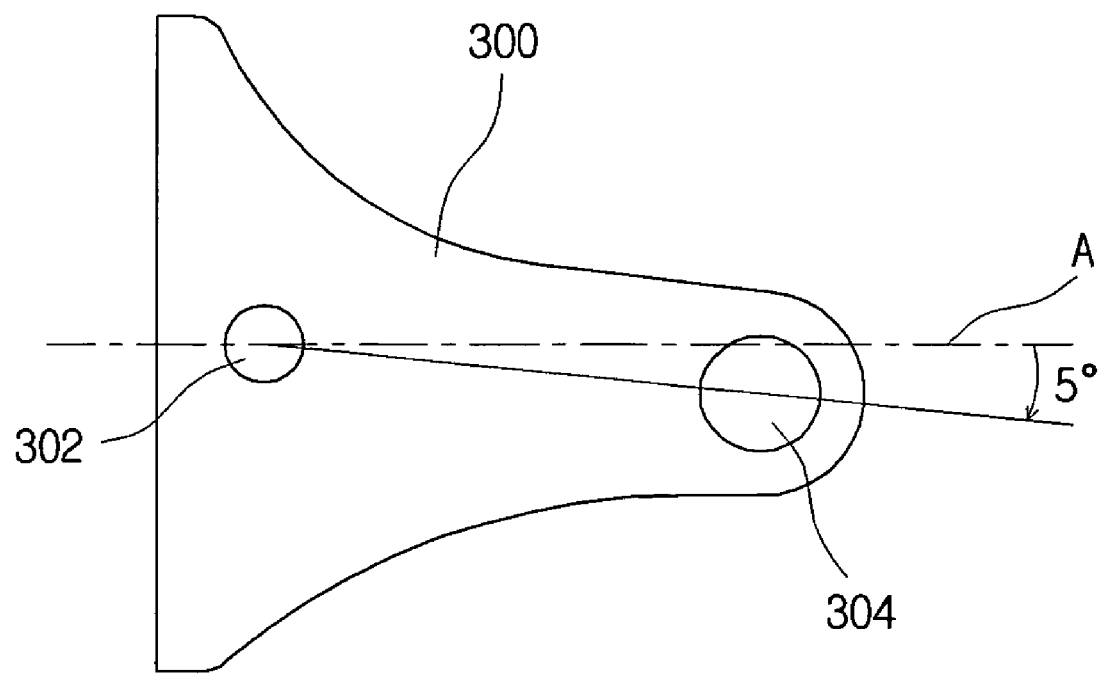

TILTING DEVICE

CROSS-REFERENCE TO RELATED APPLICATIONS

This application claims the benefit of Korean Patent Application No. 10-2007-0073261 filed with the Korean Intellectual Property Office on Jul. 23, 2007, the disclosure of which is incorporated herein by reference-in its entirety.

BACKGROUND

1. Technical Field

The present invention relates to a tilting device.

2. Description of the Related Art

Flat panel displays, such as TV sets and monitors, employing LCD, PDP, LED technology, etc., provide the benefit of allowing efficient use of small spaces, and are fast replacing Braun tube TV's and monitors. The increase in demand for such flat panel displays is expected to continue into the future. However, due to the thin thicknesses of these flat panel displays, it is difficult to have a flat panel display stand by itself, and thus mounting devices are being developed which allow flat panel displays to be mounted on walls.

The conventional mounting device, however, simply affixes the display onto the wall, so that when a user changes one's position, the optimal viewing angle cannot be maintained.

Also, when automatically tilting a mass, e.g. a display, an appropriate power source is required according to the weight of the mass. For a large display, the weight of which can be over 40 kg, a large capacity power source may be required for tilting the display, which can impose additional space limitations and increase cost.

SUMMARY

An aspect of the invention provides a tilting device which can tilt a mass using a small-capacity driving unit.

Another aspect of the invention provides a tilting device for tiltably supporting a mass. The tilting device may include: a bracket, which is attachable to and detachable from the mass, and which is configured to tilt about a rotation shaft; a nut, which is hinge-coupled to one side of the bracket about a hinge shaft; a leadscrew, which engages the nut; and a housing, which supports either side of the rotation shaft, and in which a guide indentation is formed that guides a movement of the hinge shaft.

The guide indentation can be shaped as an arc in a circle that has its center at the rotation shaft, while a sliding member may further be interposed between the guide indentation and the hinge shaft. Here, the sliding member can be an oil-retaining bearing.

The tilting device may further include a driving unit that rotates the leadscrew.

A slot may be formed in the nut, and the slot may support the hinge shaft to allow the hinge shaft to slide in a direction towards the leadscrew. A hole can be formed in one side of the bracket, through which the hinge shaft can be inserted, where the hole can be formed in a position separated by a predetermined gap in a direction of gravity from an imaginary axis that passes the rotation shaft and is perpendicular to a plane of contact between the mass and the bracket.

Additional aspects and advantages of the present invention will be set forth in part in the description which follows, and in part will be obvious from the description, or may be learned by practice of the invention.

BRIEF DESCRIPTION OF THE DRAWINGS

FIG. 5 is a side elevational view of a bracket according to an embodiment of the invention.

DETAILED DESCRIPTION

Figure 1:
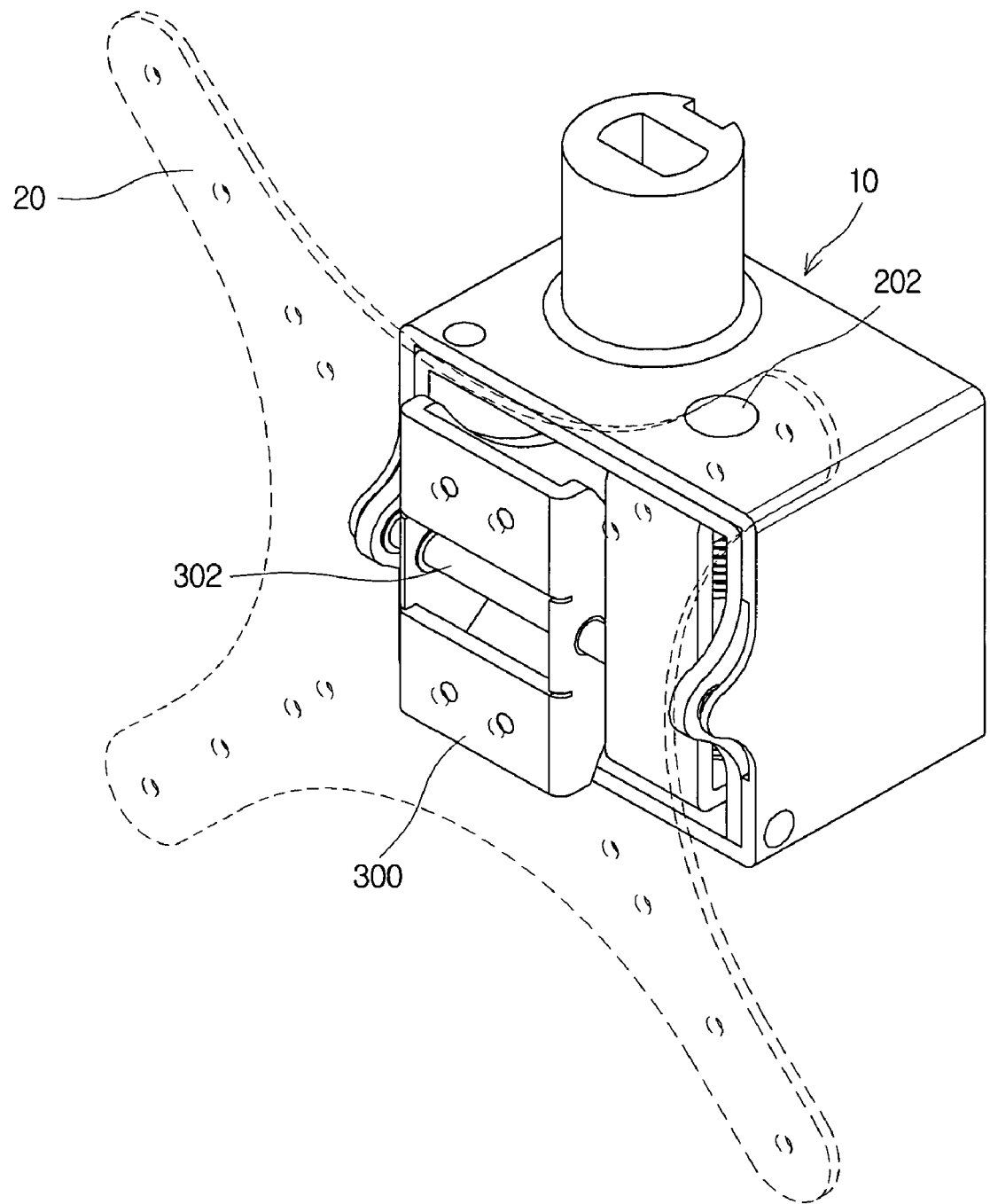
FIG. 1 is a perspective view of a tilting device according to an embodiment of the invention.

The tilting device according to certain embodiments of the invention will be described below in more detail with reference to the accompanying drawings. Those components that are the same or are in correspondence are rendered the same reference numeral regardless of the figure number, and redundant explanations are omitted.

Figure 2:
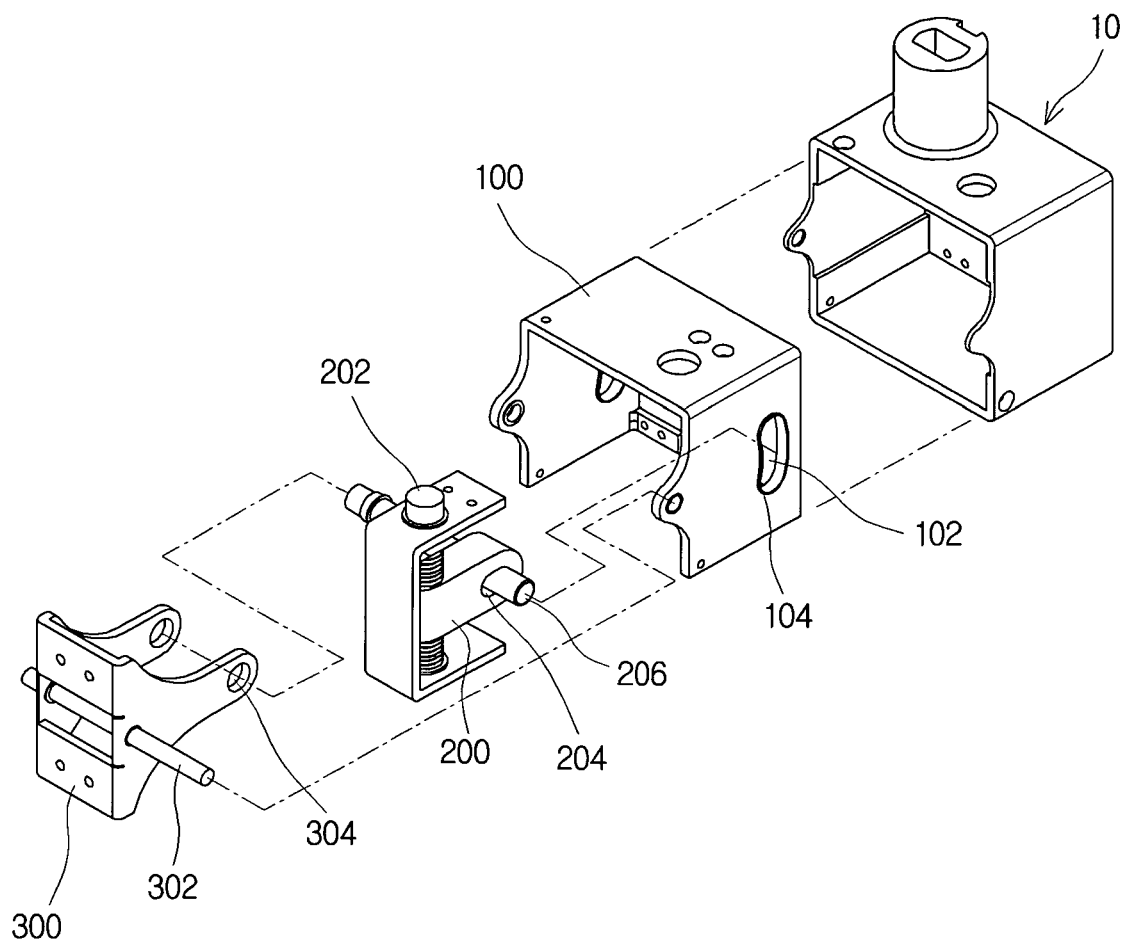
FIG. 2 is an exploded perspective view of a tilting device according to an embodiment of the invention.
Figure 3:
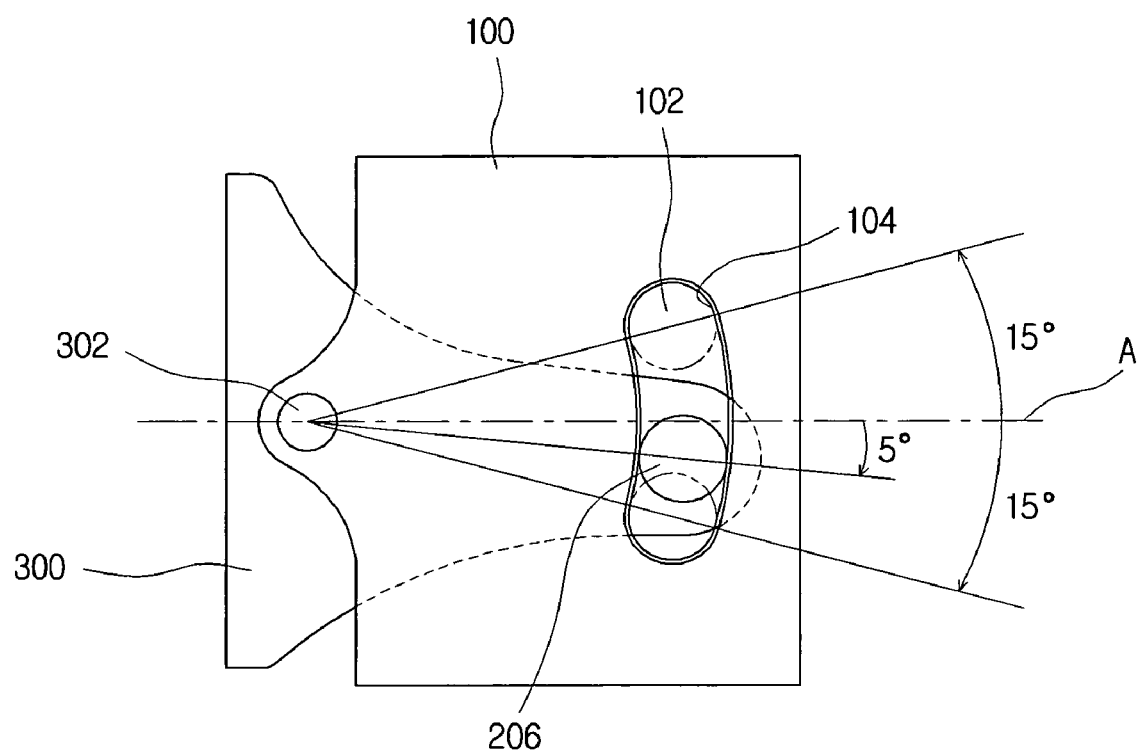
FIG. 3 is a side elevational view of a housing according to an embodiment of the invention.
Figure 4:
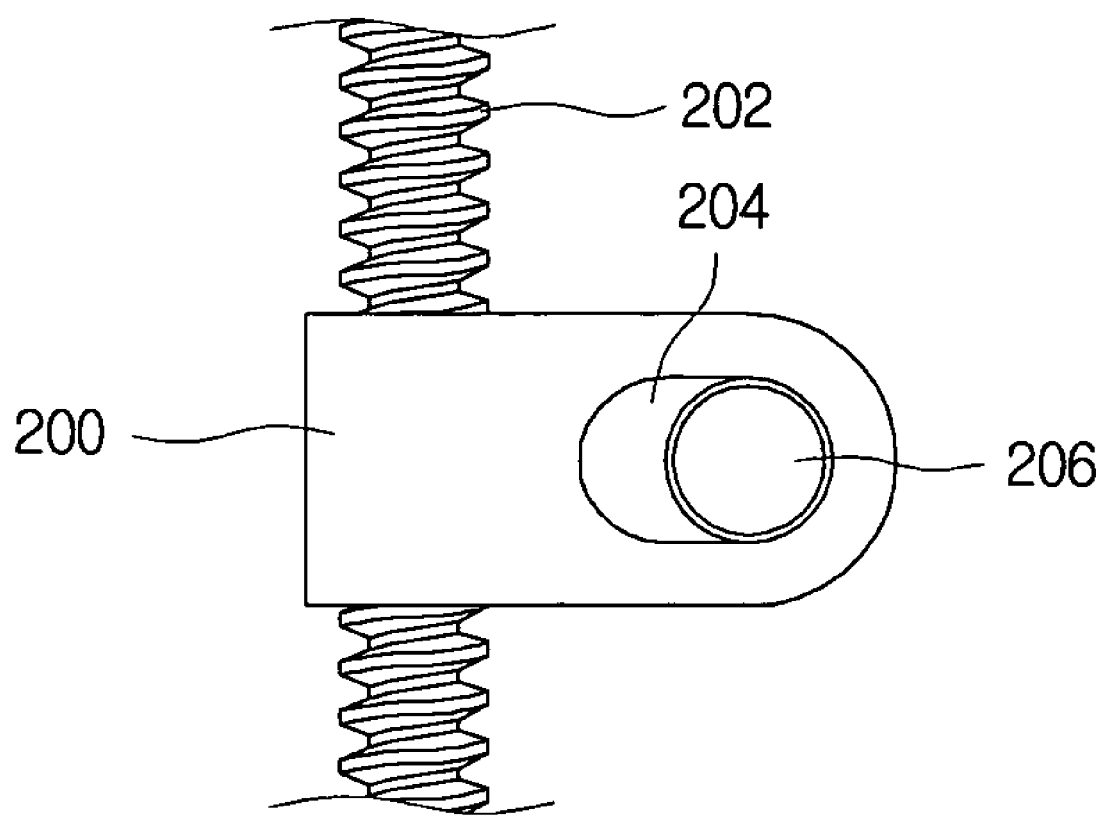
FIG. 4 is a side elevational view of a nut according to an embodiment of the invention.

FIG. 1 is a perspective view of a tilting device according to an embodiment of the invention, and FIG. 2 is an exploded perspective view of a tilting device according to an embodiment of the invention. FIG. 3 is a side elevational view of a housing according to an embodiment of the invention, FIG. 4 is a side elevational view of a nut according to an embodiment of the invention, and FIG. 5 is a side elevational view of a bracket according to an embodiment of the invention. In FIGS. 1 to 5, there are illustrated a securing part 10, a coupling part 20, a housing 100, guide indentations 102, sliding members 104, a nut 200, a leadscrew 202, a slot 204, a hinge shaft 206, a bracket 300, a rotation shaft 302, and holes 304.

A tilting device according to an embodiment of the invention may be a device that supports a mass (not shown) in a manner that allows tilting. The tilting device can include a bracket 300, which may be attachable to and detachable from the mass, and which may be configured to tilt about a rotation shaft 302; a nut 200, which may be hinge-coupled to one side of the bracket 300 about a hinge shaft 206; a leadscrew 202, which may engage the nut 200; and a housing 100, which may support either side of the rotation shaft 302, and in which a guide indentation 102 may be formed that guides a movement of the hinge shaft 206. Thus, the tilting device can tilt a mass using a simple link structure and a small-capacity driving apparatus.

The tilting device can be a device installed between a support and a mass that requires angle adjustments, to allow a user to move the mass to a required angle. In the example illustrated in FIG. 1, a mass can be mounted onto the coupling part 20, and the support can be mounted onto the securing part 10, so that the tilting device may support the mass and adjust the mass to a required angle. The support can be a device that is coupled to one side of the securing part 10 to secure the mass.

The mass is an object having a particular weight that can be supported by the support. The mass can be a display, for example, such as an LCD, PDP, etc.

The bracket 300 can be attached to and detached from the mass, and can be tilted about the rotation shaft 302. The bracket 300 can be the portion coupled with the mass, and in this particular embodiment, the bracket 300 may be coupled with the mass by way of the coupling part 20, as illustrated in FIG. 1.

FIG. 2 illustrates how the bracket 300 may tilt about the rotation shaft 302. The rotation shaft 302 can pass through the bracket 300 and can be coupled with the housing 100, so as to support the bracket 300. In other words, the bracket 300 can be said to utilize the principle of leverage for raising the mass, with the fulcrum located at the rotation shaft 302 and the input effort located at the holes 304. Thus, a heavy mass can be tilted using a compact driving apparatus.

At one side of the bracket 300, holes 304 may be formed through which the hinge shaft 206 can be inserted. The holes 304 can be formed in positions separated by a predetermined gap from an imaginary axis that passes the rotation shaft 302 and is perpendicular to the plane of contact between the mass and the bracket 300. That is, the holes 304 can be formed in positions at a predetermined angle in the direction of gravity, with the center of the rotation shaft 302 as the vertex, from the imaginary axis that passes the rotation shaft 302 and is perpendicular to the plane of contact between the mass and the bracket 300.

For example, supposing that a tilting device according to this embodiment is designed to tilt a mass within a range of 20 degrees downward and 10 degrees upward, the holes 304 may be formed in positions separated 5 degrees downwards, with the center of the rotation shaft 302 as the vertex, from the imaginary axis A that passes the rotation shaft 302 and is perpendicular to the plane of contact between the mass and the bracket 300, as illustrated in FIG. 5. That is, in certain embodiments, the predetermined gap can be a gap formed by an angle corresponding to a difference between the maximum upward or downward tilting angle and the mean of the upward and downward tilting angles, from the imaginary axis A, with respect to a vertex at the center of the rotation shaft 302. In the example illustrated for this embodiment, the gap can be 5 degrees, which is the maximum angle of 20 degrees minus the mean angle of 15 degrees.

Referring to FIG. 3, the holes 304 can be formed in positions separated by 5 degrees from the imaginary axis A with respect to the vertex at the center of the rotation shaft 302, to implement tilting within the tilting range for the example mentioned above, which includes 20 degrees downwards and 10 degrees upwards, for a total of 30 degrees. As a result, the hinge shaft 206 may implement tilting within 15 degrees upwards and downwards from the axis A, and may apply forces at the holes 304 of the bracket 300, i.e. at the input effort for the lever, while maintaining a maximum distance from the rotation shaft 302, to tilt the mass with a minimal amount of force.

A slip bearing can be interposed at the portion where the rotation shaft 302 of the bracket 300 passes through. An example of a slip bearing is an oil-retaining bearing, which will be described later in further detail.

The hinge shaft 206 can be a shaft that passes through one side of the bracket 300 to rotate the bracket 300 about the rotation shaft 302. The hinge shaft 206 can be coupled with the nut 200, so that the upward and downward motion of the nut 200 may be transferred to the bracket 300 through the holes 304 of the bracket 300.

The nut 200 can engage the leadscrew 202 and can be hinge-coupled to one side of the bracket 300 about the hinge shaft 206. The nut 200 may engage the leadscrew 202 to convert the rotational motion of the leadscrew 202 into a linear motion. As illustrated in FIG. 4, a slot 204 can be formed in the nut 200, where the slot 204 may support the hinge shaft 206 in a manner that allows sliding towards the leadscrew 202.

The hinge shaft 206 can be coupled to one side of the bracket 300, which may rotate about the rotation shaft 302, and can move in a circular motion. The hinge shaft 206 can also be inserted through the slot 204 of the nut 200, which may move upwards and downwards, so that the hinge shaft 206 may also move in a linear motion. Thus, the hinge shaft 206 may move in a partially circular trajectory and move up or down, and the slot 204 may be formed in the nut 200 to allow the hinge shaft 206 to also undergo a sliding motion. A slip bearing can be included between the slot 204 and the hinge shaft 206.

The leadscrew 202 may engage the nut 200. When the leadscrew 202 is rotated, the nut 200 engaging the leadscrew 202 can move in a linear motion. In this way, the leadscrew 202 and nut 200 can not only convert rotational motion into linear motion, but also provide a large force in a linear direction with just a small amount of torque. Thus, the mass can be tilted using a compact driving apparatus.

The tilting device according to this embodiment utilizes the principle of leverage associated with the bracket 300, as well as the leadscrew 202 configuration, consequently making it possible to tilt a mass with a small driving apparatus.

Also, the leadscrew 202 can be formed in a manner such that the rotational motion of the leadscrew 202 can be converted into a linear motion of the nut 200 but the linear motion of the nut 200 cannot be converted into a rotational motion of the leadscrew 202. Then, as the leadscrew 202 rotates to tilt the mass, the mass can be fixed without the use of a separate stopper device.

Sliding members 104 can be interposed at the portions where the leadscrew 202 is supported. The sliding members 104 can include an oil-retaining bearing.

The tilting device can further include a driving unit (not shown) that rotates the leadscrew 202. The leadscrew 202 can be rotated by the driving power of the driving unit. Examples of a driving unit include a motor and a geared motor. In the example illustrated in FIG. 2, the driving unit can be coupled to one end of the leadscrew 202. The driving unit may be such that is controlled by a control unit. The control unit may be an apparatus that receives an input signal, for example, from an apparatus such as a remote control that generates a signal according to a user's input, and drives the motor according to the input signal.

The housing 100 can support both ends of the rotation shaft 302 and can include guide indentations 102 that guide the movement of the hinge shaft 206. The housing 100 can include a space in which to house the components of the tilting device. The housing 100 can be equipped with portions that couple with the ends of the rotation shaft 302 to support the rotation shaft 302, as well as with one or more holes through which the leadscrew 202 may be exposed to the exterior.

The guide indentations 102 may guide the movement of the hinge shaft 206. The guide indentations 102 can be formed in both sides of the housing 100, each shaped as an arc that follows a part of a circle having a center at the rotation shaft 302. Thus, the hinge shaft 206 can be inserted through the slot 204 of the nut 200, to move in an upward and downward motion, and can be inserted in the holes 304 of the bracket 300, to move in a circular motion about the rotation shaft 302. Therefore, the guide indentations 102 can be formed in the shape of an arc for a circle having its center at the rotation shaft 302.

The angle of the arc shapes may be determined according to the pre-defined tilting range of the mass. For the example described above, in which the mass is to be tilted within a range of 20 degrees downwards and 10 degrees upwards for a total range of 30 degrees, the guide indentations 102 can be formed as 30 degree arcs in positions separated by substantially the same distance between the holes 304 and the rotation shaft 302 of the bracket 300.

Each of the arc shapes can be formed in vertical symmetry with respect to an imaginary horizontal axis passing through the rotation shaft 302. The arcs can guide the hinge shaft 206 such that the hinge shaft 206 maintains a maximum distance from the rotation shaft 302 within the range of tilting angles. By keeping the hinge shaft 206 at a maximum distance from the rotation shaft 302, the location of the input effort for the bracket 300 can be placed as far away as possible, so that the tilting of the mass can be achieved, using the principle of leverage, with a minimum amount of driving power.

In addition to facilitating the movement of the hinge shaft 206 by guiding the movement of the hinge shaft 206, the guide indentations 102 can also support the hinge shaft 206 in a manner that distributes the force applied by the nut 200 on the hinge shaft 206. With the rotation of the leadscrew 202, the nut 200 may receive a force in the upward or downward direction, which can be transferred to the hinge shaft 206. Then, the hinge shaft 206 inserted through the holes 304 of the bracket 300 can tilt the mass, using the principle of leverage, while being supported by the guide indentations 102.

As illustrated in FIG. 3, sliding members 104 can be interposed between the guide indentations 102 and the hinge shaft 206, to facilitate the movement of the hinge shaft 206. A smoother movement of the hinge shaft 206 may further aid the tilting of the mass with a small driving power.

A sliding member 104 can be, for example, an oil-retaining bearing. One type of oil-retaining bearing can include a sintered material and a lubricant retained in the pores of the sintered material. When the sintered material undergoes a relative motion while in contact with another object, the lubricant held in the sintered material can flow out due to the pumping effect or the thermal expansion of the lubricant, so that the friction may be reduced at the contact surface.

When the relative movement is stopped, the lubricant may return again into the sintered material due to capillary action, and thus it may not be necessary to re-supply the lubricant. The oil-retaining bearing can include a plastic material as the oil-retaining layer. For example, a layer of Teflon coating can be formed over a layer of brass, for use as the oil-retaining layer.

The sliding member 104 can be implemented as a sintered soilless bearing, an soilless bearing, or a dry bearing.

While the spirit of the invention has been described in detail with reference to particular embodiments, the embodiments are for illustrative purposes only and do not limit the invention. It is to be appreciated that those skilled in the art can change or modify the embodiments without departing from the scope and spirit of the invention. As such, many embodiments other than those set forth above can be found in the appended claims.

What is claimed is:

1. A tilting device tiltably supporting a mass, the tilting device comprising:
    a bracket attachable to and detachable from the mass and configured to tilt about a rotation shaft;
    a nut hinge-coupled to one side of the bracket about a hinge shaft;
    a leadscrew engaging the hinge-coupled nut; and
    a housing supporting either side of the rotation shaft and having a guide indentation formed therein, the guide indentation configured to guide a movement of the hinge shaft,
    wherein the guide indentation is configured to maintain a predetermined maximum distance between the hinged shaft and the rotation shaft.

2. The tilting device of claim 1, wherein the guide indentation is shaped as an arc of a circle having a center at the rotation shaft.

3. The tilting device of claim 1, wherein a sliding member is further interposed between the guide indentation and the hinge shaft.

4. The tilting device of claim 3, wherein the sliding member is an oil-retaining bearing.

5. The tilting device of claim 1, wherein a hole is formed in one side of the bracket, the hole having the hinge shaft inserted therethrough, and
    the hole is formed in a position separated by a predetermined gap in a direction of gravity from an imaginary axis, the imaginary axis passing the rotation shaft and perpendicular to a plane of contact between the mass and the bracket.

6. A tilting device tiltably supporting a mass, the tilting device comprising:
    a bracket attachable to and detachable from the mass and configured to tilt about a rotation shaft;
    a nut hinge-coupled to one side of the bracket about a hinge shaft;
    a leadscrew engaging the hinge-coupled nut; and
    a housing supporting either side of the rotation shaft and having a guide indentation formed therein, wherein
        the guide indentation is configured to guide a movement of the hinge shaft,
        the hinged-coupled nut has a slot formed therein, and
        the slot supporting the hinge shaft such that the hinge shaft is slidable in a direction towards the leadscrew.

7. The tilting device of claim 6, wherein the guide indentation is shaped as an arc of a circle having a center at the rotation shaft.

8. The tilting device of claim 6, wherein a sliding member is further interposed between the guide indentation and the hinge shaft.

9. The tilting device of claim 8, wherein the sliding member is an oil-retaining bearing.

10. The tilting device of claim 6, wherein a hole is formed in one side of the bracket, the hole having the hinge shaft inserted therethrough, and
    the hole is formed in a position separated by a predetermined gap in a direction of gravity from an imaginary axis, the imaginary axis passing the rotation shaft and perpendicular to a plane of contact between the mass and the bracket.

11. The tilting device of claim 6, wherein the guide indentation is configured to maintain a predetermined maximum distance between the hinge shaft and the rotation shaft.

* * * * *